April 17, 1962   N. C. HALL ETAL   3,030,151
DUMP BOXES
Filed June 10, 1960
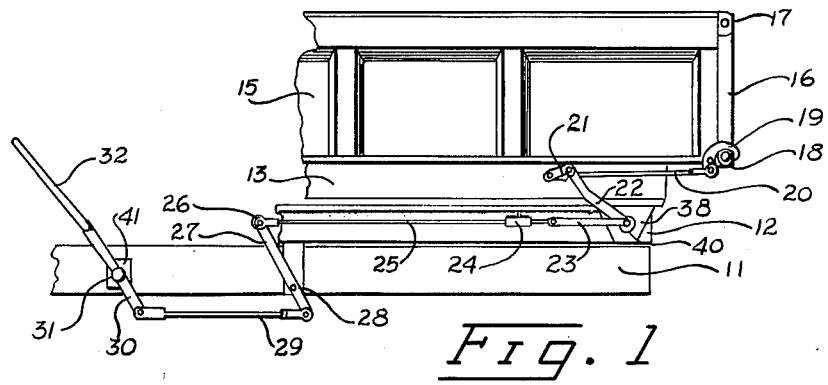
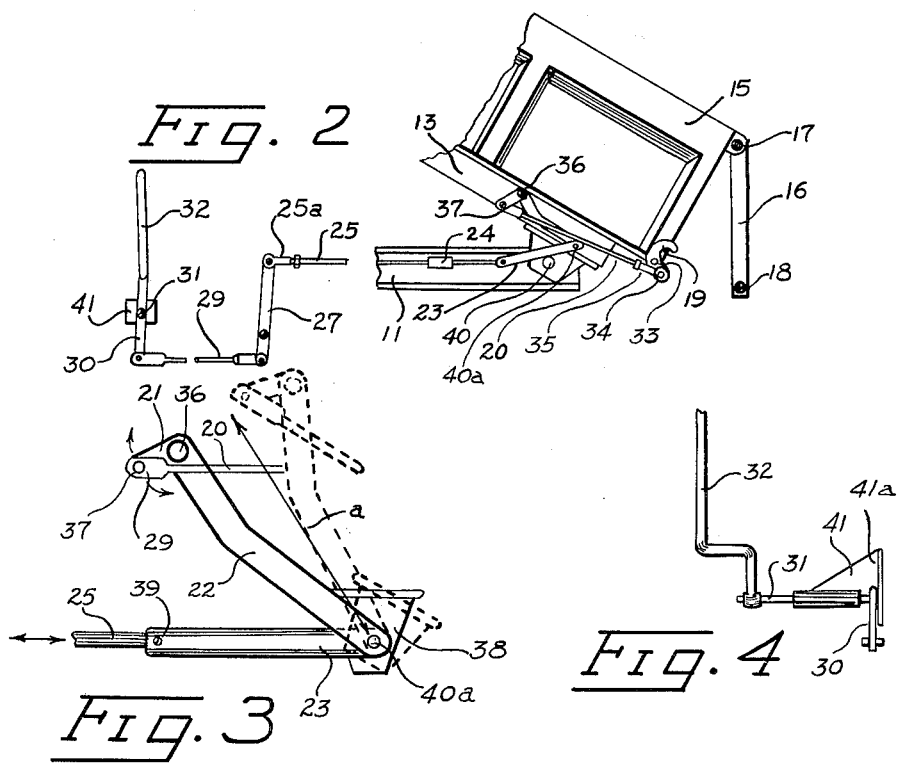
INVENTOR.
NATE C. HALL &
BY LA VON C. HALL
Corey & Corey
Atty's

United States Patent Office 3,030,151
Patented Apr. 17, 1962

3,030,151
DUMP BOXES
Nate C. Hall, 141 N. Monroe St., and La Von C. Hall, 449 S. Harrison, both of Lancaster, Wis.
Filed June 10, 1960, Ser. No. 35,268
1 Claim. (Cl. 298—23)

This invention relates to a dump box and more particularly to lever means adapted to unlatch the tailgate of such a box at any angle of elevation.

In a dump box it is general practice to hinge the tailgate to the upper rear portion of the box and to provide a latch to lock the tailgate in a closed position. The latch is usually manually operated, and when the box is elevated the operator then leaves the cab of the truck and goes to the rear of the truck where he manually moves the latch to an opened position, at which instant the gate swings outwardly and the load within the box slides out of the box.

In a procedure such as we have just described, there is a considerable element of risk and danger to the operator, both by reason of his absence from the cab of the truck where the controls which operate the box are located, and by reason of his presence at the point where the load is being dumped. The problem in providing a remote leverage mechanism to unlatch the tailgate is the fact that the box, in being angularly elevated to dump the load, changes its radial position with reference to the frame of the truck to which any proposed leverage mechanism must be attached.

It is therefore a primary object of our invention to provide a device in which a series of linkage and pivot mechanisms may be aligned in relation to the frame of the truck with the rearwardly operative portions so disposed that the elevation of the box will not affect their linear relationship.

It is a further object of our invention to provide a device which is purely mechanical in structure and may be easily installed on the frame of the truck and alongside the underframe of the dump box, such structure being adaptable to any truck and dump box, regardless of make or model.

It is yet another object of our invention to provide a device in which the leverage factors through the train of links are multiplied to provide maximum force with which any frictional binding condition will be readily overcome by manual movement of the control lever.

It is yet another object of our invention to provide a device in which one linkage member of the assemblage maintains a substantially identical parallel relationship to the frame of the vehicle, regardless of the angle assumed by the box.

It is still another object of our invention to provide a device relatively simple in mechanism and inexpensive in manufacture.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claim, without departing from the spirit of the invention.

In said drawings:

FIGURE 1 is a side view of a portion of a dump box mounted upon a portion of a truck frame, the linkage mechanism being shown in a train lengthwise of said truck frame and said box frame.

FIGURE 2 is another view of a partial box and partial frame including the leverage mechanism, in which the box is shown in an elevated position with an open tailgate.

FIGURE 3 is an enlarged view of that portion of the linkage adjacent the pivotal mounting of the box on the frame, the position of the linkage when the box is parallel to the truck frame being shown in solid lines, and the position of the linkage when the box is fully elevated being shown in dotted lines, and FIGURE 4 is a view of the control lever and of the mounting mechanism therefor.

Referring now to the drawings:

In FIGURE 1 the main frame of the truck is shown at 11 and the main frame of the dump box at 12. The box itself is indicated at 15, its sub-frame being number 13. The end gate 16 is mounted on the rear of the box by means of a pivotal hinge 17. At the lower portion of the gate is a pin 18 which extends outwardly from the gate and is engaged by a latch member 19 which is pivoted on the box for radial movement by a pin 33. It is this latch which must be moved into and out of engagement with the pin 18 to permit the gate 16 to swing into an open position when the box is elevated as shown in FIGURE 2.

To move this latch member 19, we have provided a linkage mechanism, part of which is mounted on the truck frame 11 and part on the stationary box frame member 12.

The control handle of this linkage mechanism is indicated generally at 32. The handle is positioned on the forward portion of the truck frame, usually within the truck cab. To attach this handle to the frame, we have provided a shaft 31 which in turn extends through a supported bearing member 41 which includes a mounting plate 41a which may be attached to the frame of the truck. The inner end of the shaft 31 is rigidly fastened to the downwardly extending arm 30 which in turn is connected to the first longitudinal linkage member 29. The linkage member 29 in turn is pivotally attached to an upwardly extending lever member 27 which in turn is pivoted on the stationary main frame 12 at 28. The upwardly extending portion of this lever 27 is in turn pivotally attached at 26 to a second rearwardly extending linkage rod 25, the rearward portion of this rod being supported by a bearing 24.

At the outer end of this rod is a pivotally attached linking member 23. This member is positioned such that it is free to move radially upwardly when the linking rod 27 is moved rearwardly. The outer end of the linking member 23 is pivotally attached to an angular arm 22 which extends upwardly towards the box 15.

It is this portion of the structure which is of particular importance in the proper operation of the leverage train. It will be noted that the lower end of the link 22 is positioned at a point in line with the axis about which the box 15 rotates when it is elevated. The pivotal mounting of the box itself is indicated by the numeral 40 which designates the pivot pin on which the dump box rotates. This pivot pin is fixedly attached to the dump box stationary frame member 12. A plate 38 rotates on this pin and in turn is fixedly attached to the sub-frame 13 of the box 15. It will be obvious that regardless of the angle of elevation of the box, the radial distance indicated generally at "a" of FIGURE 3, remains the same between the pin 40 and the opposite end of the link 22, which is a second pin 36. It is to be noted that the pivotal connection between the link 23 and the link 22, indicated at 40a, is separate from the main pivot pin 40 on which the box itself is hinged.

As previously stated, the lever arm 22 extends upwardly towards the box. The upward end is pivoted on a pin 36 which in turn is fixedly attached to the box sub-frame 13. Extending outwardly and downwardly from the pin 36 and the arm 22 is the short radial projection 21 which has in its outer end a fixed pin 37. A final linking member 20 is pivotally attached to this pin 37 and extends rearwardly beneath the box to the latch member 19, being pivotally attached to the lowermost portion thereof at 34.

In the operation of this lever train, the control handle 34 is moved rearwardly by the operator, which causes the link 29 to move forwardly, the lever 27 to rotate about the pin 28, the upper portion thereof then causing the links 25 to move rearwardly. This in turn causes the link 22 to rotate about its mounting pin 36. The link member 23, being pivoted at both ends, can move radially upwardly to cause the rotation of the lever 22. The lever 22 in turn moves the linking rod 20 rearwardly and the latch member is rotated out of engagement with the pin 18 and the tailgate is permitted to swing outwardly if the box is in an elevated position.

Referring now to FIGURE 3; it will be seen that as the box is elevated, the radial link 22 pivots about the pin connection 40a. The rearwardly extending link 20 maintains its substantially parallel relation with the box 15. When the box has reached the degree of elevation desired by the operator, he then moves the lever 32 and the linkage operates to move the lever arm 22 in an arc about its pivotal mounting 36. The nature of this movement may be observed by comparison between the structures shown in FIGURE 1 and FIGURE 2, the link 23 being pivotally mounted on one end at 39. On the other end at 40a is a floating link which permits the change in relationship previously described. It will be apparent that the relationship of the angular linking arm 22 and its respective pivot points and the floating link 23 is such that the latch 19 may be operated at any degree of elevation which may be selected by the operator and that no binding action can occur at any point. The bearing 24 is provided to maintain the linking rod 25 in a substantially parallel relation to the frame member 12.

From the foregoing description it will be evident that we have provided a lever train which may be mounted on any truck frame and adapted to any truck box. All of the linkage rods—that is, 20, 25 to 29, are provided with an adjustable end such as is shown at 25a of FIGURE 2. This comprises a conventional threaded fork member with a lock nut which receives a threaded rod such as 25.

Although we have described a specific embodiment of our invention, it is apparent that modifications thereof may be made by those skilled in the art. Such modifications may be made without departing from the spirit and scope of our invention as set forth in the appended claim.

We claim as our invention:

In a tailgate latch assembly adapted to be mounted on a combination of a truck frame and a pivotally mounted dump box having a pivotally mounted tailgate, a control lever adapted to be mounted within the cab of a truck, said control lever extending downwardly alongside the frame of the truck, linkage members extending rearwardly from the lowermost portion of said control lever, said linkage members including a pivotal mounting portion midway of said truck frame, a bearing member on said truck frame intermediate a pivoted mounting of the dump box to the frame and said pivotal mounting portion of said linkage members and a rearmost link of said linkage members extending through and guided by said bearing in a direction lengthwise of said frame, said rearmost link terminating in spaced relation between said bearing and the pivotal mounting of said dump box on said truck frame, a floating link pivotally mounted at its forward end to the rear of said rearmost member of said linkage members, the outer end of said floating link being positioned substantially on the axis of rotation of the dump box in its pivotal connection on the truck frame when the dump box is in load-carrying position, and an L-shaped lever mounted on the dump box, the lowermost portion thereof being connected to the outer end of said floating link, the opposite end of said L-shaped lever having a link extending rearwardly of said dump box, said dump box having a tailgate latch pivotally mounted directly thereon adjacent said tailgate, said last mentioned link being operatively connected to said latch, said floating link preventing binding in said linkage members.

References Cited in the file of this patent
UNITED STATES PATENTS
2,299,922    Newell _____ Oct. 27, 1942